United States Patent
Guy

[15] 3,654,029

[45] Apr. 4, 1972

[54] APPARATUS FOR MAKING NET-LIKE STRUCTURES

[72] Inventor: Warren H. Guy, Glen Mills, Pa.
[73] Assignee: FMC Corporation, Philadelphia, Pa.
[22] Filed: July 13, 1970
[21] Appl. No.: 54,442

Related U.S. Application Data

[62] Division of Ser. No. 762,116, Sept. 24, 1968, Pat. No. 3,562,046.

[52] U.S. Cl. .................................156/441, 18/12 N, 156/500
[51] Int. Cl. ..............................................................D04h 3/16
[58] Field of Search...............18/12 N, 12 R, 13 K; 156/167, 156/180, 244, 181, 500, 501; 264/167, DIG. 81; 161/DIG. 6, 209; 156/433, 441

[56] References Cited

UNITED STATES PATENTS

| | | |
|---|---|---|
| 3,163,691 | 12/1964 | Anderson et al......................18/12 N |
| 3,234,071 | 2/1966 | Ward et al. ........................156/167 X |
| 3,584,102 | 6/1971 | Fairbanks ..........................156/167 X |

Primary Examiner—J. Spencer Overholser
Assistant Examiner—Norman E. Lehrer
Attorney—Thomas R. O'Malley, George F. Mueller and Eugene G. Horsky

[57] ABSTRACT

Apparatus for making a net-like structure by which streams of strand-forming material are extruded and combined in crossing relationship, and including means which permit the streams to be connected to each other at only selected of their locations of crossing whereby the resulting structure includes mesh strands which are bonded to certain of the strands crossing therewith to form integral, unitary strand junctions and are unconnected to other of such strands at their points of crossing.

6 Claims, 5 Drawing Figures

Patented April 4, 1972

Patented April 4, 1972

APPARATUS FOR MAKING NET-LIKE STRUCTURES

This application is a division of application Ser. No. 726,116, filed Sept. 24, 1968, now Pat. No. 3,562,046.

The present invention relates to an apparatus for making a net-like structure or fabric having crossing strands which are unconnected to each other at certain of their points of crossing.

U.S. Pat. No. 2,919,467 is directed to the manufacture of net-like structures in which the mesh intersection-forming portions are each composed of an integrally extruded plastic mass and the mesh strand-forming portions are divisions of such intersection-forming portions, with the whole fabric or structure being an integrally extruded entity. Various modifications of equipment and operation are described in this prior patent but, in general, the structures which result are all essentially of two-dimensional character wherein an integral junction is formed at every intersection of mesh strands. Such known net-like structures have found little use in applications where fabrics are conventionally employed, often lack the necessary strength for their proposed or intended uses, and have only limited tear-propagation resistance. Accordingly, a primary object of this invention is to provide a generally new or improved and more satisfactory apparatus for making a net-like structure or fabric.

Another object of this invention is the provision of an improved apparatus for making net-like structures which are three-dimensional in character and more closely approach a woven fabric in appearance.

Still another object is the provision of an apparatus for producing net-like structures in a variety of designs.

A further object is the provision of an improved apparatus in which a variety of plastic materials are simultaneously extruded to provide net-like structures having different characteristics along selected portions thereof.

A still further object is the provision of an improved apparatus for making a net-like structure which is simple in construction and use, has a minimum of moving parts, and experiences no significant wear, after prolonged usage, which has any effect upon the characteristics of the net-like structure which is produced.

These and other objects are achieved in accordance with the present invention by an apparatus by which a series of spaced, unconfined streams of flowable strand-forming material are extruded toward each of the opposite sides of a surface. The term "surface" is employed throughout the description and claims in its geometrical sense as a two-dimensional locus of points and thus includes both plain and curved (i.e., cylindrical) surfaces. Concomitantly with the extrusion the locations at which respective streams of each series of streams are extruded, or points of extrusion, are moved in unison along a plane substantially at right angles to the longitudinal direction of the surface, with the extruded streams of one series moving relative to the streams of the other of such series. The portions of the extruded streams of strand-forming material located in the vicinity of the surface are continuously advanced longitudinally of such surface so that the extruded streams of one series cross with the extruded streams of the other of such series.

The streams of the two series of streams are obstructed at only selected of their locations of crossing and thus streams of such one series of streams remain separated from the streams of the other of such series at such selected locations and contact and bond with each other at the remaining locations of crossing. The crossing streams, which are advanced longitudinally of the surface, are set to provide an integral net-like structure or fabric having crossing strands which are bonded to each other at only certain of their points of crossing.

Preferably, relative movement between the series of streams is effected by moving both series of streams, desirably with one series of such streams moving in a direction opposite to the direction of the other of such series of streams. The rate of speed at which the two series of streams are moved may be the same or may differ and may be varied throughout the operation to provide the resulting net-like structure with a desired mesh size or decorative effect. The mesh pattern can also be controlled by the rate at which the crossing streams are advanced longitudinally of the surface.

The crossing streams may be obstructed, and thus prevented from contacting with each other, for example, at alternate locations of crossing or perhaps two or three or more of such crossing locations depending upon the flexibility and bulk characteristics and/or pattern desired in the finished net-like structure or fabric.

More particularly, the apparatus of the present invention includes a thin barrier element having a plurality of spaced slots extending longitudinally from one end thereof and an extrusion member positioned opposite to and in spaced relationship with each of the opposite sides of the barrier element. The opposing sides of the extrusion members each are formed with a series of spaced orifices to which flowable strand-forming material is delivered under pressure and from which such material is extruded as continuous streams directed toward and against the barrier element. Means are provided for effecting relative movement between the extrusion members and between such members and the barrier element and for continuously advancing, longitudinally of the barrier element and toward its slotted end, the streams of strand-forming material which have been impinged against the opposite sides thereof. As a result of these movement, the streams of strand-forming material which are extruded from the opposing series of orifices are disposed in crossing relationship on the barrier element and contact and bond with each other only in the areas of the barrier element slots. Means are also provided for setting the streams of strand-forming material which have been impinged against the barrier element.

The barrier element employed is as thin as possible, yet should be sufficiently rigid so as to avoid any significant flexing under the pressures of the streams of strand-forming material which are impinged against its opposite sides. Since both sides of the barrier element are being impinged by extruded streams and, in view of the comparatively low pressures of such streams, the barrier element employed may be perhaps 1/32 inch or 1/64 inch or less in thickness depending upon its material of construction. To insure smooth and easy movement of the streams of strand-forming material along the barrier element, such element is preferably formed of or at least coated with a polytetrafluoroethylene resin.

The widths of the slots in the barrier element are, desirably equal to each other and to the width of the unslotted areas but may be varied without departing from the scope of the present invention. It will be apparent that the narrower these unslotted areas are made, the closer is the spacing of the barrier element slots and the greater is the frequency at which the crossing streams of strand-forming material bond with each other. With more frequent crossing of such streams, the smaller are the mesh openings in the resulting net-like structure or fabric.

The barrier element and the extrusion members may be of flat or annular construction. Preferably, the barrier element is maintained stationary while the extrusion members themselves are moved, desirably in opposite directions and at the same rate of speed. It is, of course, possible to operate the described apparatus with one of the extrusion members being fixed while the barrier element and the remaining extrusion member are moved relative to each other or in opposite directions. This arrangement, however, complicates the movement of the streams of strand-forming material along the barrier element and is thus not preferred.

Relative movement between the extrusion members is provided by reciprocating the same in opposite directions, in the case of flat extrusion members, and by oscillating or continuously rotating the extrusion members in opposite directions, in the case of annular extrusion members. The rate at which these members are moved can be varied, with the faster the rate of such movement the smaller are the mesh openings in the resulting net-like structure or fabric. Further, the stroke of reciprocating or oscillating members need not be the same and may be periodically varied throughout the operation of the apparatus to impart a desired mesh pattern or decorative effect to the resulting net-like structure.

The extrusion orifices in each series of such orifices may be of the same or different size and/or configuration and may also vary in spacing and/or number to provide a desired mesh pattern or decorative effect. Likewise the flowable strand-forming materials delivered to the extrusion orifices may differ in composition and/or in color so that the crossing mesh strands of the resulting net-like structure will exhibit different properties, such as color or texture, along different areas thereof. It will be further apparent that the pressure under which the streams of strand-forming material is extruded may be such as to actually cause the streams which are impinged against one side of the barrier element to actually project through the slots therein and extend beyond the opposite side of such element. In this instance, the resulting net-like structure would have a bulked and significant three-dimensional character.

The teachings of the present invention are applicable for use with a variety of materials, which are referred to by the term "plastic," and "flowable strand-forming materials" including materials which are thermoplastic, such as polyamides or superpolyamides, polyesters, polyvinyl chloride, copolymers thereof, polyolefins, cellulose acetates, etc., natural or synthetic rubbers, thermosetting materials or wet-spinnable materials, such as viscose, cupro-ammonium cellulose, or carboxymethyl cellulose. Such materials may include various additives such as stabilizers, dyes, foaming agents, etc., if so desired. It will be apparent that the manner by which the extruded junction and mesh strand-forming streams are set will depend upon the particular material which is being employed.

For a greater understanding of the invention, reference is made to the following detailed description and drawing, in which FIG. 1 is a plan view of one embodiment of the apparatus of the present invention;

Figure 1:
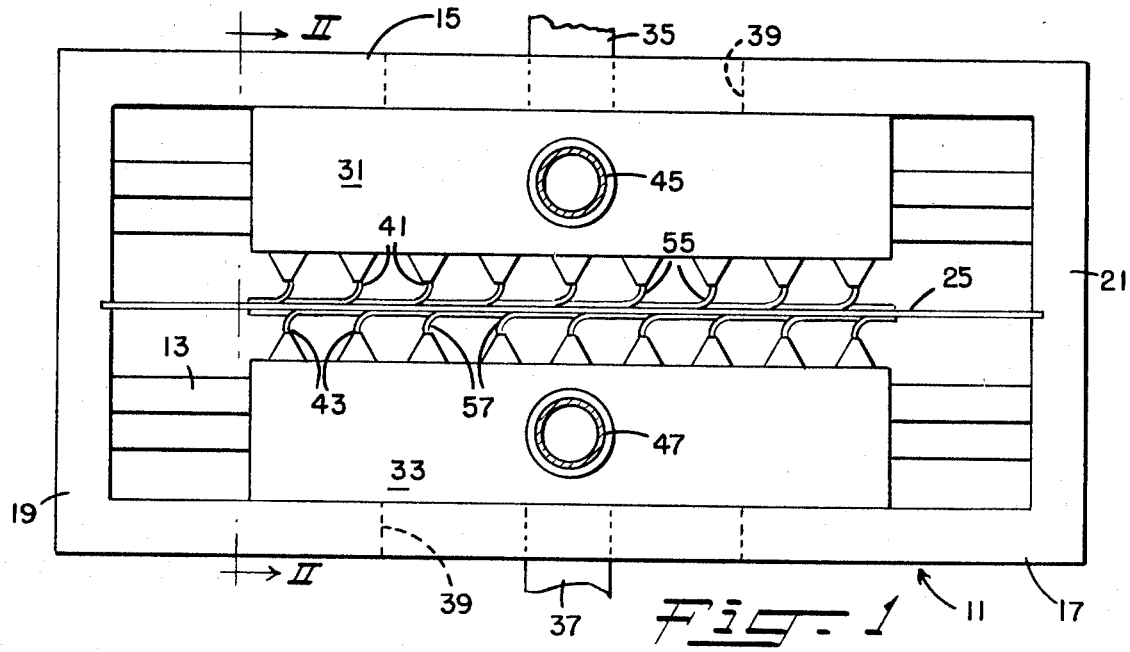
Figure 2:
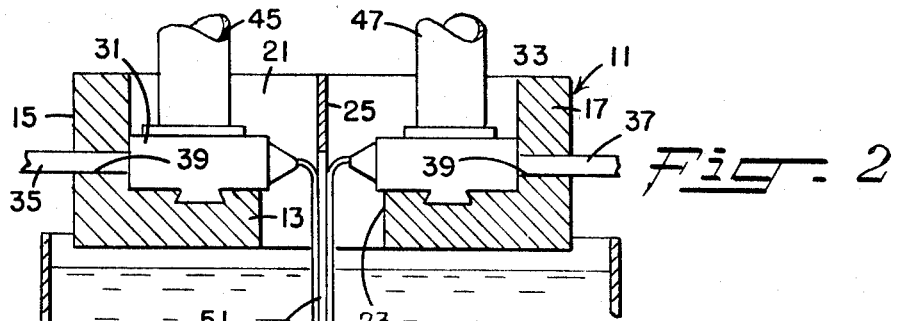
FIG. 2 is a vertical section taken transversely of the apparatus shown in FIG. 1 substantially along the line II—II.

With reference to FIGS. 1 and 2 of the drawing, the embodiment of the apparatus there illustrated includes an elongated guide block 11 having a bottom wall 13, side walls 15 and 17, and end walls 19 and 21. An elongated opening 23 is formed in the bottom wall 13 and extends between the end walls 19 and 21.

Figure 3:
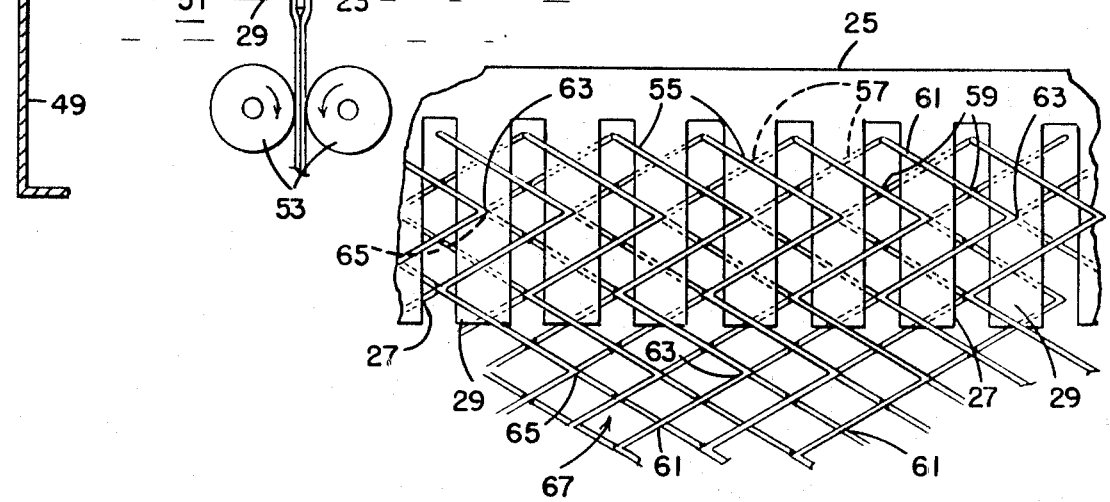
FIG. 3 is a side view of a portion of the apparatus shown in FIG. 1 and illustrates a net-like structure or fabric which is produced.

A thin barrier element 25 is fixed between the end walls 19 and 21 and projects centrally through opening 23 and well below the lower face of the bottom wall 13. As shown in FIG. 3, the barrier element 25 is formed with a series of spaced slots 27 which extend longitudinally thereof from one end, leaving a plurality of spaced finger portions 29. The barrier element 25 is preferably made of or at least coated with polytetrafluoroethylene resin.

Dovetailed to the bottom wall 13 for sliding movement relative to opposite sides of the barrier element 25 are hollow extrusion members 31 and 33. Arms 35 and 37, fixed to the respective members 31 and 33, project through slots 39 formed in the guide block side walls 15 and 17 and are connected to suitable drive means, not shown, for reciprocating the members 31 and 33 in opposite directions relative to each other and in timed relationship.

The extrusion members 31 and 33 are similar in construction, with the member 31 having a series of spaced extrusion orifices 41 and the member 33 having a like series of extrusion orifices 43. Conduits 45 and 47 open into the extrusion members 31 and 33, respectively, for delivering a flowable strand-forming material under pressure to the two series of extrusion orifices 41 and 43 from a suitable source, not shown.

A tank 49 is located below the guide block 11 and contains a bath 51 of suitable liquid for setting the extruded streams of strand-forming material. As shown in FIG. 2, the slotted end of the barrier element 25 projects well into the bath 51. Positioned within the tank 49, below the bath surface and on opposite sides of the plane of the barrier element 25, are rollers 53 which are driven in the directions as indicated by arrows by suitable means, not shown.

In the operation of the above-described apparatus, reciprocating motion is imparted to the extrusion members 31 and 33 through arms 35 and 37 and a flowable strand-forming material, such as molten polyethylene, is delivered under pressure into each of such members through the conduits 45 and 47. This molten polyethylene issues from the series of orifices 41 and 43 as continuous streams 55 and 57, respectively, which impinge against the opposite sides of the barrier element 25. The barrier element 25, being partially immersed within a bath 51 of cold water or the like, is cooled and may be still further chilled by a contained refrigerant applied to its upper end so that the extruded streams of molten polyethylene are at least partially set when impinged against the opposite sides of such barrier element.

At the start of operations, the portions of the streams 55 and 57 of molten polyethylene which are initially impinged against the opposite sides of the barrier element 25, and thus partially set, are merely drawn by hand downwardly relative to the barrier element and in-between the rollers 53. Once this lacing is completed the portions of the continuously extruded streams 55 and 57 of molten polyethylene which are subsequently impinged against the barrier element 25 are continuously drawn down into the water bath by the rollers 53 for complete quenching. As a result of the reciprocating movement of the extrusion elements 31 and 33, combined with the movement of the at least partially set streams of strand-forming material relative to the barrier element 25, the streams 55 and 57 issuing from the series of orifices 41 and 43 assume paths which are inclined relative to both horizontal and vertical planes and will, therefore, cross in a manner as illustrated in FIG. 3.

The locations of crossing of the extruded series of streams 55 and 57 which occur within the areas defined by the barrier element slots 27 contact and bond with each other to form junctions as shown at 59. At the remaining locations of crossing, such as shown at 61, the series of extruded streams 55 and 57 are obstructed by the finger portions 29 of the barrier element 25 and thus remain separated from each other.

As the extrusion members 31 and 33 complete their travel in their respective directions and reverse their movement, the extruded streams 55 and 57 also change directions, as shown at 63 and 65, respectively, without any interruption in their continuity. With the continued reciprocating movement of the members 31 and 33, the extruded streams of each series of streams will assume zig-zag or sinuous paths changing directions at locations indicated at 63 and 65.

As the series of crossing streams 55 and 57 are advanced longitudinally of the barrier element 25 and completely set within the water bath 51, the resulting net-like structure has an appearance as indicated generally at 67 in FIG. 3 and includes mesh strands and strand junctions. These mesh strands are bonded to each other at the junctions 59 so that all of the strands are integrally connected to each other. At their crossing locations indicated at 61, the mesh strands remain separated or unconnected and thus impart a three-dimensional character to the net-like structure 67, in addition to rendering it more flexible and resistant to tearing.

In the particular net-like structure shown in FIG. 3 it will be noted that at the locations 63 and 65, at which the streams 55 and 57 of each series of extruded streams change directions of travel, the mesh strands in the resulting net-like structure 67 overlay but are unattached to each other. This construction thus serves to emphasize the three-dimensional character of the resulting net-like structure 67. It will be apparent that by changing the stroke of movement of the members 31 and 33, for example, the locations 63 and 65 at which the streams 55 and 57 reverse their directions of travel can be made to meet within the areas defined by the slots 27 of the barrier element 25. In this manner, the mesh strands in the resulting net-like structure 67 would, of course, be bonded to each other at the locations 63 and 65.

Figure 4:
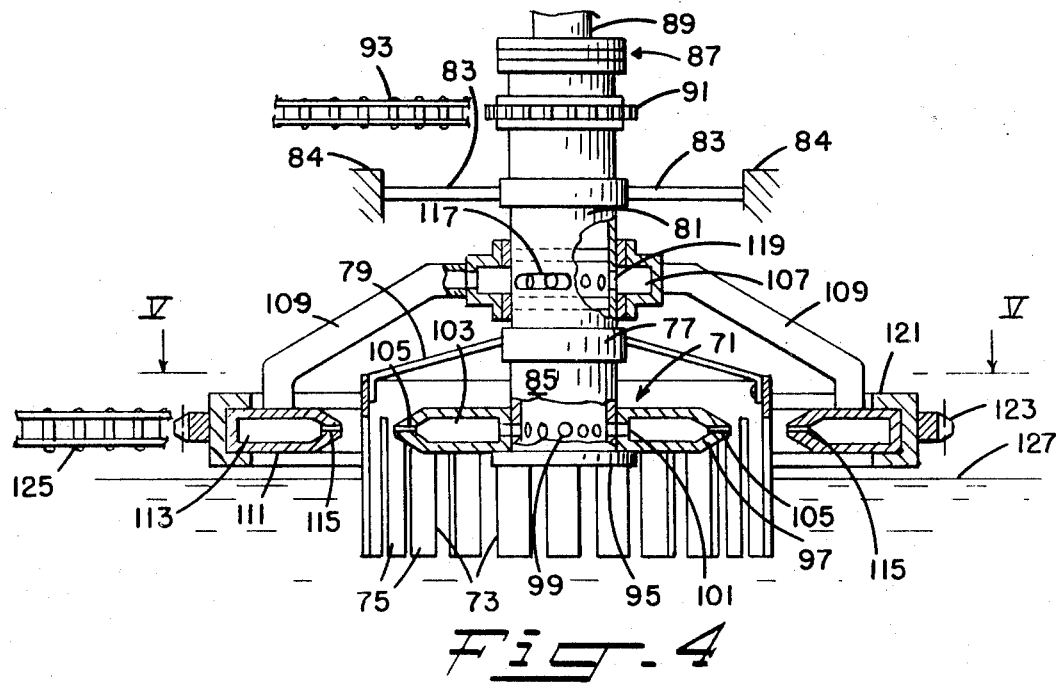
FIG. 4 is a side view of a second embodiment of the apparatus of the present invention, with portions thereof shown in sections.

The apparatus shown in FIG. 4 of the drawing is designed for making a tubular net-like structure and includes a thin cylindrical barrier element 71 having a plurality of slots 73 extending from one end thereof and which are separated by finger portions 75. The barrier element 71 is attached by a collar 77 and support arms 79 to a sleeve 81 which is in turn fixed by supports 83 to a stationary portion of the apparatus as indicated at 84.

Extending through the sleeve 81 is a conduit 85 which is connected at its upper end, by a rotary coupling 87 to a pipe 89 leading from a suitable source of flowable strand-forming material under pressure, not shown. A sprocket 91 is fixed to a conduit 85 and is driven by a chain 93 from a suitable means, not shown.

The lower end of the conduit 85 is closed by a plate 95 and carries, in fixed relationship therewith, a hollow, annular extrusion member 97. Openings 99 are formed at spaced intervals about the conduit 85 and are aligned with similar openings 101 formed in the extrusion member 97 for delivering strand-forming material into a cavity 103 of the extrusion member 97. A series of spaced orifices 105 are formed along the outside periphery of the extrusion member 97 through which the strand-forming material is extruded from the cavity 103 as such extrusion member 97 is turned.

Mounted on the outside of the fixed sleeve 81 for rotation relative thereto is an annular housing 107. A plurality of hallow arms 109 extend from housing 107 and support, at their lower ends, a hollow, annular extrusion member 111. This extrusion member 111 is formed with a cavity 113 and also includes a series of spaced extrusion orifices 115 along its inside periphery.

In the area encompassed by the housing 107, the sleeve 81 is provided with a plurality of slots 117 which communicate with openings 119 in the conduit 85 and with the housing itself. Thus, flowable strand-forming material which is under pressure within the conduit 85 passes through the openings 119 and slots 117 in the conduit 85 and sleeve 81, respectively, flows through the hollow support arms 109 and is received within the cavity 113 of the extrusion member 111.

A ring 121 is fixed to the outside periphery of the extrusion member 111 and carries a sprocket 123 which is driven by a chain 125 from a suitable drive source, not shown.

A bath 127 of liquid for setting the extruded strand-forming material is positioned below the above-described apparatus with the slotted end of the barrier element 71 being immersed therein. Suitable means, such as the rollers 53 which are employed in the apparatus shown in FIG. 2, are provided for advancing streams of strand-forming material, which have been impinged against the barrier element 71, longitudinally thereof and into the setting bath 127.

Figure 5:
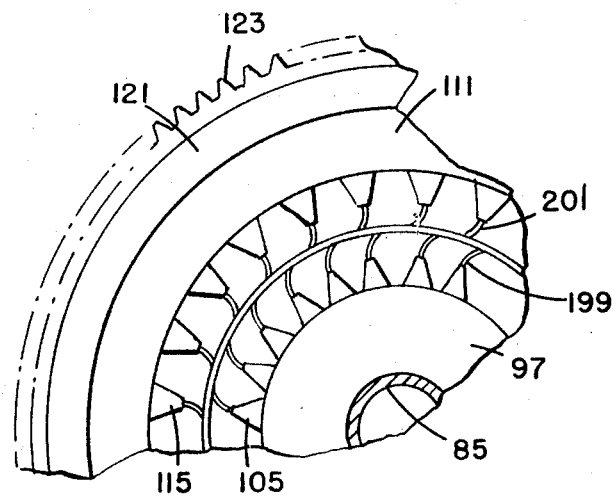
FIG. 5 is a horizontal section of the apparatus shown in FIG. 4, taken substantially along the line V—V.

In the operation of the apparatus shown in FIGS. 4 and 5 of the drawing, flowable strand-forming material, such as molten polyethylene, is delivered under pressure through pipe 89 and into the conduit 85. Flowing through the aligned openings 99 and 101 in the conduit 85 and extrusion member 87, respectively, the molten polyethylene fills the cavity 103 in the member 97. At the same time, the molten polyethylene passes through the openings 119 in the conduit 85 and slots 117 in the sleeve 81 and fills the annular housing 107 and hollow support arms 109. From these arms 109 the molten polyethylene passes into and fills the cavity 113 of the extrusion member 111.

The chains 93 and 125 are then set into operation to oscillate or rotate the respective extrusion members 97 and 111 in opposite directions and preferably at the same rate of speed.

The molten polyethylene issues from the series of orifices 105 of the member 97 as streams 199 while the molten polyethylene is extruded from the orifices 115 of the member 111 as streams 201. These extruded series of streams 199 and 201 impinge against opposite sides of the barrier element 71. As with the embodiment shown in FIGS. 1–3 the initial portions of such streams are drawn by hand downwardly relative to the barrier element 71 and into the bath 127 where they are laced in between a suitable advancing means, such as the rollers 53 employed in the embodiment shown in FIG. 2.

As a result of the oscillation or rotation of the extrusion members 97 and 111, combined with the advancement of the extruded streams longitudinally of the barrier element 71, subsequent portions of the extruded streams 199 and 201 impinge against the barrier element 71 in crossing relationship.

As in the operation of the embodiment shown in FIGS. 1–3, the crossing of the streams 199 and 201 within the areas defined by the barrier element slots 73 contact and bond with each other to provide junctions. The portions of such streams 199 and 201 which are obstructed by the finger portions 75 of the barrier element will, of course, remain separated from each other. The streams impinged against the barrier element 71 are continuously advanced longitudinally toward the slotted end thereof and into the bath 127 where they are completely set to provide the desired net-like structure.

It is to be understood that changes and variations may be made without departing from the spirit and scope of the invention as defined in the appended claims.

I claim:

1. Apparatus for continuously extruding a net-like structure including a thin barrier element having a plurality of spaced slots extending longitudinally from one end thereof, a pair of extrusion members, each of said members positioned in spaced relationship with and opposite to a different side of said barrier element, a series of spaced orifices in the opposing sides of said members, means for feeding flowable strand-forming material to said orifices under pressure for extruding therefrom as continuous streams directed toward and against opposite sides of said barrier element, means providing relative movement between said members and between said members and said barrier element, means for continuously advancing longitudinally of said barrier element and toward the slotted end thereof the streams of strand-forming material impinged against the opposite sides thereof whereby the streams extruded from the opposing series of orifices during relative movement of said members are disposed in crossing relationship on said barrier element and contact and bond with each other only in the areas of said barrier slots, and means for setting the streams of strand-forming material impinged against said barrier to provide an integral net-like structure.

2. Apparatus as defined in claim 1 wherein said barrier element is at least coated with polytetrafluoroethylene resin along opposite sides thereof.

3. Apparatus as defined in claim 1 wherein the slots and unslotted areas of said barrier are substantially equal in width.

4. Apparatus as defined in claim 3 including means for maintaining said barrier element in fixed position and means for moving said members in opposite directions relative to each other.

5. Apparatus as defined in claim 4 wherein said barrier element is a flat plate disposed in a vertical position and wherein said members are of flat and elongated construction and are reciprocated horizontally in opposite directions in planes which are generally parallel to said barrier element.

6. Apparatus as defined in claim 4 wherein said barrier element is cylindrical and wherein said members are of concentric, annular construction and are rotated about the axes thereof.

* * * * *

UNITED STATES PATENT OFFICE
CERTIFICATE OF CORRECTION

Patent No. 3,654,029         Dated  April 4, 1972

Inventor(s) Warren H. Guy

It is certified that error appears in the above-identified patent and that said Letters Patent are hereby corrected as shown below:

Col. 1, line 3, "726,116" should read --762,116--.
Col. 2, line 26, "movement" should read --movements--.
Col. 5, line 30, "hal-"should read --hol- --.

Signed and sealed this 22nd day of August 1972.

(SEAL)
Attest:

EDWARD M. FLETCHER, JR.
Attesting Officer

ROBERT GOTTSCHALK
Commissioner of Patents